(12) United States Patent
White

(10) Patent No.: US 6,591,270 B1
(45) Date of Patent: Jul. 8, 2003

(54) METHOD FOR ORGANIZING MAP DATA

(75) Inventor: Kerry White, Hoffman Estates, IL (US)

(73) Assignee: Navigation Technologies Corporation, Chicago, IL (US)

( * ) Notice: Subject to any disclaimer, the term of this patent is extended or adjusted under 35 U.S.C. 154(b) by 272 days.

(21) Appl. No.: 09/629,224

(22) Filed: Jul. 28, 2000

(51) Int. Cl.[7] ............................................... G06F 17/30
(52) U.S. Cl. ...................... 707/101; 707/200; 701/209; 382/243
(58) Field of Search ................................ 707/101, 200; 382/243; 701/209

(56) References Cited

U.S. PATENT DOCUMENTS

| | | | |
|---|---|---|---|
| 4,888,698 A | 12/1989 | Driessen et al. | 701/200 |
| 5,170,353 A | 12/1992 | Verstraete | 701/202 |
| 5,513,110 A | 4/1996 | Fujita et al. | 701/207 |
| 5,953,722 A | 9/1999 | Lampert et al. | 707/100 |
| 5,963,956 A | 10/1999 | Smartt | 707/104.1 |
| 5,968,109 A | 10/1999 | Israni et al. | 701/208 |
| 6,035,299 A * | 3/2000 | White et al. | 707/101 |
| 6,112,153 A * | 8/2000 | Schaaf et al. | 701/200 |
| 6,141,454 A * | 10/2000 | Seymour et al. | 382/243 |
| 6,324,470 B1 * | 11/2001 | White | 701/209 |
| 6,430,497 B1 | 8/2002 | Gaertner et al. | 701/200 |

FOREIGN PATENT DOCUMENTS

WO   WO 99/58934   11/1999 ........... G01C/21/20

OTHER PUBLICATIONS

Samet, Hanan: "The Strategies for Optimizing the Use of Redundancy in Spatial Databases", *The Design and Analysis of Spatial Data Structures*, ISBN 0–201–50255–0, Chapter 2.4 (No date).

Matsuyama, et al.: "A file Organization for Geographic Information Systems Based on Spatial Proximity", *Computer Vision, Graphics, and Image Processing* 26, 303–318. 1984.

* cited by examiner

Primary Examiner—Charles Rones
(74) Attorney, Agent, or Firm—Frank J. Kozak; Jon D. Shutter; Lawrence M. Kaplan

(57) ABSTRACT

A method and system for organizing and storing map data that facilitates use of the map data by navigation application programs such as those in navigation systems. The map data represent geographic features located in a region. The map data are organized into parcels such that each parcel contains a portion of the map data. The map data contained in each parcel represent those geographic features contained in a corresponding separate one of a plurality of rectangular areas located in the region. Each rectangular area has a uniform dimension in a first coordinate direction but has a dimension in the other coordinate direction such that the map data that represent the geographic features contained in the rectangular area are close to, but do not exceed, a maximum data size for a parcel.

36 Claims, 4 Drawing Sheets

TOP TWO HORIZONTAL SECTIONS GROUPED INTO PARCELS

HORIZONTAL SECTIONS OF FIXED DELTA LATITUDE

TOP TWO HORIZONTAL SECTIONS GROUPED INTO PARCELS

PARCEL NUMBERING AND ORDER

Figure 3

INTERSECTING RECTANGLE

METHOD FOR ORGANIZING MAP DATA

BACKGROUND OF THE INVENTION

The present invention relates to a method and system for the organization and storage of map data that facilitate use of the map data by navigation application programs such as those in navigation systems. The present invention also relates to a physical storage medium having map data stored thereon having the aforementioned method of organization.

Most navigation systems use map data that are stored on read-only disks (e.g., CD-ROM disks, DVD-ROM disks, etc.) or hard disks. An important factor that affects the performance of some navigation system features, such as map display, is the time required to fetch the map data from the disk. A large portion of the time required to fetch map data is attributable to the seek time of the device (i.e., the time for the read head of the navigation system to move from a current track to the track where the data are located). This factor is important for CD-ROM and DVD-ROM disks but also applies to some extent to hard disks.

Because seek time accounts for a large portion of the time required to fetch data from a disk, techniques for organizing map data have been developed that reduce the number of seeks (and thus the total seek time) for a given request thereby helping to improve navigation system performance. One way to reduce the number of seeks when accessing map data for certain navigation system functions is to organize the map data spatially. In general, when map data are organized spatially, geographic features that are close together physically in the geographic region are represented by data records that are physically (or logically) close together in the map database (and possibly also close together on the medium upon which the map data are stored).

There are various methods by which data that represent geographic features can be organized spatially. One of the ways that data that represent geographic features can be organized spatially is to first identify groups of data entities that represent geographic features that are located close together and then arrange the groups spatially. The groups of data may be referred to as "parcels," "buckets," or "map regions," although other terminology may also be used. The data entities within each group may also be organized spatially or the data entities within a group may be organized according to another arrangement. Methods for organizing map data spatially are described in U.S. Pat. Nos. 5,968,109 and 5,974,419, the entire disclosures of which are incorporated by reference herein.

Some map data parcelization techniques attempt to achieve uniform data size parcels (e.g., 32 or 64 kilobytes per parcel) or fixed geographic size parcels (e.g., 0.02 degree delta latitude by 0.03 degree delta longitude or some other latitude/longitude "rectangle"). A disadvantage of uniform data size parcels is that when a map display rectangle spans several parcels that are not adjacent on the disk, several seeks are required to fetch the requested data, thereby possibly adversely affecting navigation system performance. On the other hand, a disadvantage of uniform geographic size parcels is that the data sizes of parcels vary widely from densely populated areas to sparsely populated areas. If the area corresponding to each uniform geographic size parcel is too small, the overhead necessary to store information about each parcel becomes excessive. However, if the area corresponding to uniform geographic size parcel is too large, the amount of data contained in densely populated regions may exceed the data size limitations of a parcel. For example, if two-byte offsets are used to locate byte positions of a parcel, then the inherent limit of 64 kilobytes constrains the amount of data that can be stored in a parcel.

Accordingly, there is a need for an improved way to organize map data that reduces the number of fetches needed to obtain the data required to represent an area while accommodating wide variations in data density across a region.

SUMMARY OF THE INVENTION

To address these and other objectives, the present invention comprises a method and system for organizing and storing map data that facilitates use of the map data by navigation application programs such as those in navigation systems. The map data represent geographic features located in a region. The map data are organized into parcels such that each parcel contains a portion of the map data. The map data contained in each parcel represent those geographic features contained in a corresponding separate one of a plurality of rectangular areas located in the region. Each rectangular area has a uniform dimension in a first coordinate direction but has a dimension in the other coordinate direction such that the map data that represent the geographic features contained in the rectangular area are close to, but do not exceed, a maximum data size for a parcel.

BRIEF DESCRIPTION OF THE DRAWINGS

FIG. 3 is a diagram illustrating a manner for numbering and ordering the parcels of map data formed according to the process described in connection with FIGS. 1 and 2.

DETAILED DESCRIPTION OF THE PRESENTLY PREFERRED EMBODIMENTS

The first embodiment for organizing map data described herein provides for reading any map area in no more than two seeks. Furthermore, the embodiment achieves relatively uniform size data parcels, while avoiding the problem of having those parcels spread all over the disk.

First Parcelization Method

The following method for organizing map data can be used to generate parcels that require no more than two seeks per map display rectangle at a given zoom level. Prior to organizing the data, a maximum data size for a parcel of map data is determined, e.g., 32 kilobyte, 64 kilobyte, 128 kilobyte, etc.

Step 1

Figure 1:
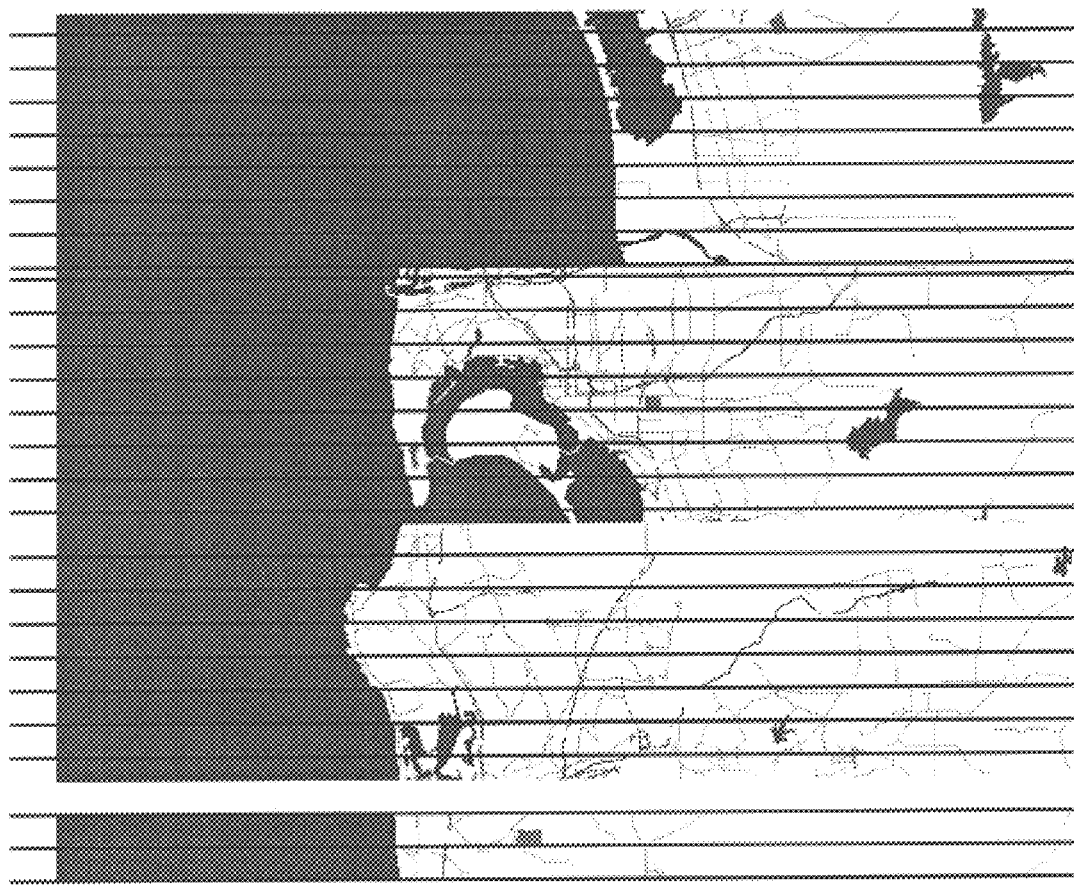
FIG. 1 is a map of a geographic area and is used to illustrate a step in a process according to a first embodiment for organizing map data.

Starting with a database of map data that represent geographic features in a given region, a maximum change in latitude that would be displayed for a given map zoom level is determined. For example, assume a navigation system has a display measuring 12 cm (horizontal) by 9 cm (vertical). At a given zoom level, the change in latitude that would correspond to 12 cm on the display is determined. (The greater of the horizontal and vertical measurements is used in order to provide for reorientation of direction on the display). This change in latitude can be referred to as "Delta-Y." Beginning at the northern (or southern) end of the database, the entire map database coverage is divided into intermediate collections that represent horizontal intermediate sections (or bands) of map data each exactly Delta-Y latitude units high. FIG. 1 shows this process implemented for a portion of San Diego County.

Step 2

Figure 2:
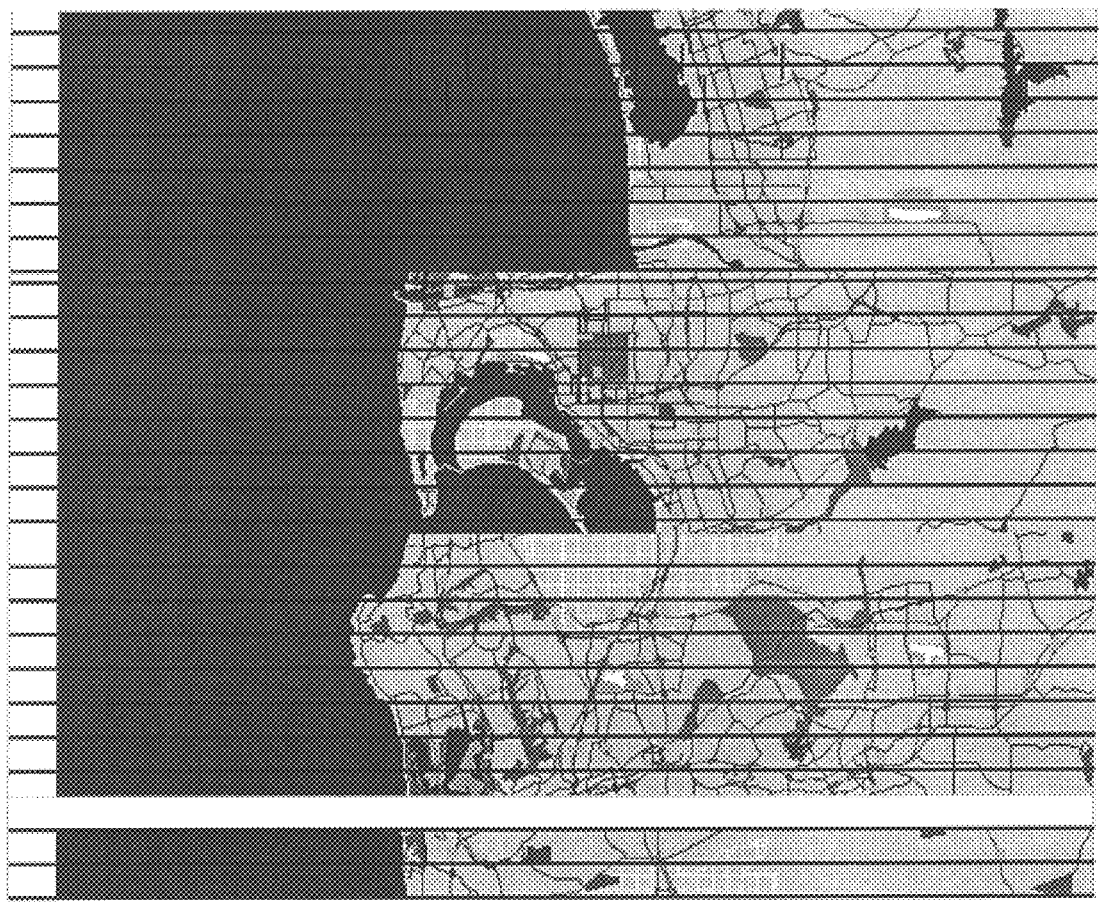
FIG. 2 is the same map of the geographic area shown in FIG. 1 and is used to illustrate another step in the process for organizing map data.

The map data associated with each horizontal intermediate section are grouped into parcels. For each horizontal intermediate section, grouping of map data into parcels begins with the data representing the geographic features at one end (i.e., either the west end or east end) of the horizontal intermediate section and works toward the opposite end of the horizontal intermediate section. The map data associated with an intermediate section are grouped into a parcel when the previously determined maximum data size for a parcel is reached without exceeding the previously determined maximum data size, e.g., 32 kilobytes, 64 kilobytes, 128 kilobytes, etc. (When determining a parcel boundary, some percentage may be reserved for parcel overhead.) This process for forming parcels is performed for each horizontal intermediate section corresponding to the map database. In densely populated areas, the rectangular areas corresponding to parcels will have narrow widths. In sparsely populated areas, the rectangular areas corresponding to parcels will be wide. By definition, all rectangular areas corresponding to parcels have the same height. FIG. 2 shows the same region as in FIG. 1. In FIG. 2, the data representing the features in the top two horizontal intermediate sections have been organized into parcels. The longitudinal boundaries of each of the parcels are shown by the vertical lines.

Step 3

Figure 3:
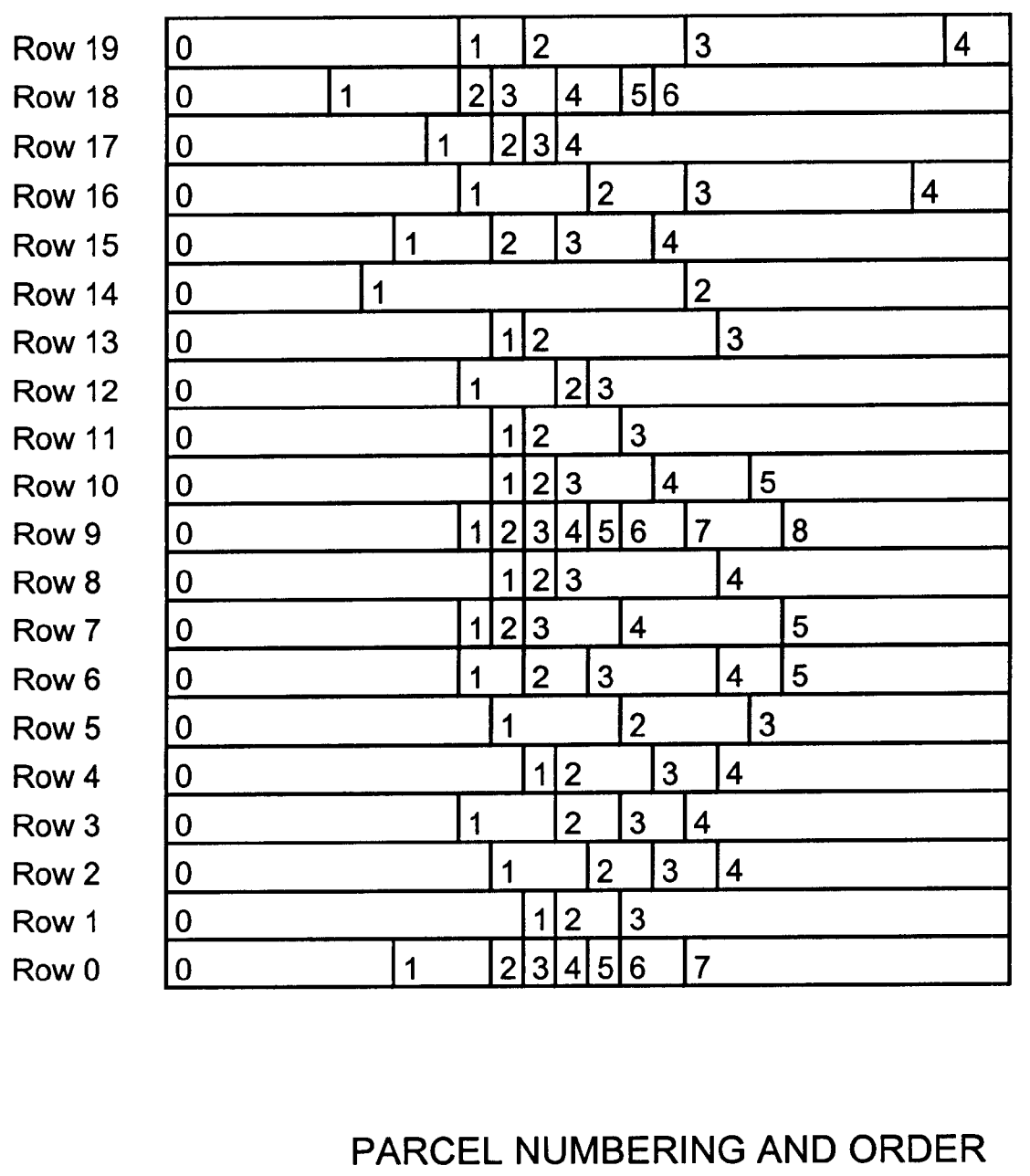

Once all the parcels have been defined, they are organized serially on the media, e.g., the CD-ROM disk, the DVD-ROM disk, hard disk or other media. (If a CD-ROM disk or DVD disk is used, it may be rewritable or not rewritable.) The parcels are organized beginning with the parcel that represents the data contained in the rectangular area at one corner and proceeding to the parcels that contain the data that represent the features contained in the rectangular areas along a horizontal row to the end thereof and jumping back to the beginning of the next row. Parcels can be identified by assigning each parcel a unique parcel ID. Parcel IDs can be assigned by either row and column or by using a serial numbering technique beginning at one corner and ending at the opposite corner. FIG. 3 illustrates the ordering of parcels for placement on the media.

Fetching Map Data

Figure 4:
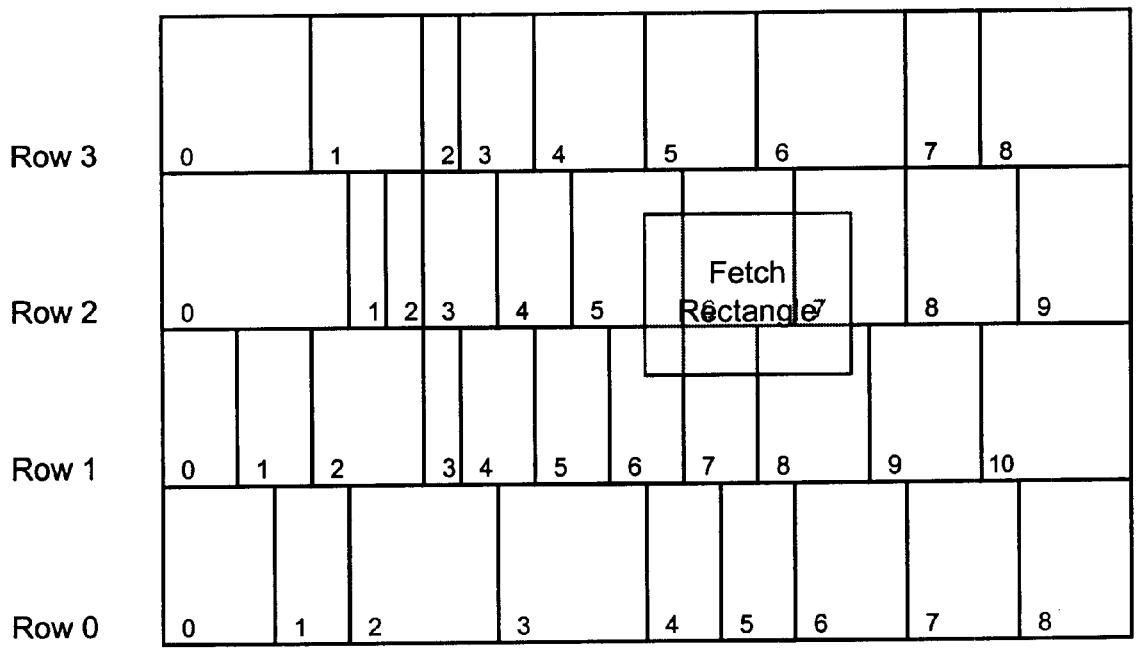
FIG. 4 is a diagram illustrating how map data organized according to the process described in connection with FIGS. 1–3 can be fetched by a navigation system.

Any time the map display application of the navigation system requests a map rectangle for display, all the parcels that intersect the map rectangle are identified. Using the embodiment for parcelization of map data described above in connection with FIGS. 1–3, the rectangle will not intersect more than two rows of parcels. As a result, the intersecting parcels can be read in a maximum of two seeks. FIG. 4 shows an example in which a map display application in a navigation system requests data corresponding to a rectangular area. The rectangular area is referred to in FIG. 4 as the "fetch area." In FIG. 4, the requested rectangle intersects with parcels 6, 7, and 8 of row 1 and parcels 5, 6, and 7 of row 2. Because the parcels in each row are adjacent, parcels 6, 7, and 8 in row 1 can be read in one seek, and parcels 5, 6, and 7 in row 2 and be read after a second seek.

Alternatives

In the first embodiment of the method for organizing map data described above, the map data were first divided into intermediate collections based upon uniform sized horizontal sections (i.e., sections that extend in a latitudinal direction from a west side of the region to the east side) and then parcels were formed from each intermediate collection by determining longitudinal boundaries for each parcel within each intermediate collection based upon an amount of data needed to form a parcel of a desired parcel size without exceeding a maximum parcel size. In an alternative embodiment, the coordinate directions can be exchanged. Thus, in an alternative embodiment, the intermediate collections can be formed of uniform sized vertical sections (i.e., sections that extend in a longitudinal direction from a north side of the region to the south side) and then the parcels can be formed from each intermediate collection by determining latitudinal boundaries within each intermediate collection based upon an amount of data needed to form a parcel of a desired parcel size without exceeding a maximum parcel size.

In the first embodiment described above, a size (i.e., "Delta-Y") was chosen for the horizontally extending intermediate sections based upon the change of latitude that would be shown at a given zoom level on the display of the navigation system. In the first embodiment described above, the intermediate horizontal sections of map data were all Delta-Y units in height. With parcels formed of intermediate horizontal sections having this Delta-Y size, the map data needed to display a given rectangular portion of the region can be fetched with not more than two seeks. This principle can be extended. For example, if the intermediate horizontal sections were half the size of the change of latitude that would correspond to the display size (e.g., ½ times Delta-Y), a given rectangular area could be fetched in not more than three seeks; if the intermediate horizontal sections were one third times the size of the change of latitude that would correspond to the display size (e.g., ⅓ times Delta-Y), a given rectangular area could be fetched in not more than four seeks, and so on.

In yet another embodiment, if the intermediate horizontal sections were larger than the size of the change of latitude that would correspond to the display size, a given rectangular area could be fetched a significant percentage of the time in only one seek. For example, if the intermediate horizontal sections were twice the size of the change of latitude that would correspond to the display size (e.g., 2 times Delta-Y), a given rectangular area could be fetched approximately half the time in only one seek.

In the first embodiment, the size (i.e., "Delta-Y.") was chosen for the horizontally extending intermediate sections based upon the change of latitude that would be shown at a given zoom level on the display of the navigation system. Navigation systems may support a plurality of different zoom levels. Accordingly, separate layers of map data may be prepared, each layer corresponding to a separate one of the plurality of different zoom levels. Each separate layer would be formed using the method according to the first embodiment.

In the first described embodiment, the process for forming a map database included the step of first dividing the entire map database coverage into intermediate collections that represent horizontal intermediate sections (or bands) of map data each exactly Delta-Y latitude units high and then forming parcels from each of the intermediate collections. In an alternative embodiment, these steps can be combined. For example, after determining the value for Delta-Y, parcels can be formed from the original collection of map data without first separating the map data into intermediate collections corresponding to the intermediate sections.

According to this alternative process, parcels are formed from the original collection of map data by starting with the data representing the features at a corner of the region and moving a rectangular window raster-like across the region. The window has a dimension in one coordinate direction equal to Delta-Y and has a dimension in the other coordinate direction that starts at zero and is increased until a parcel is formed. A parcel is formed each time the data encompassed within the window reaches the maximum data size for the parcel.

In the embodiments described above, it was stated that the map data are stored on CD-ROM disks, DVD disks or hard disks. The disclosed embodiments are not limited to any particular kind of media or technology and any type of data storage media available now or that becomes available in the future may be used.

It is intended that the foregoing detailed description be regarded as illustrative rather than limiting and that it is understood that the following claims including all equivalents are intended to define the scope of the invention.

I claim:

1. A method of organizing map data on a physical storage medium, wherein the map data represent geographic features located in a region, the method comprising:

separating the map data into a plurality of separate parcels, wherein each parcel contains a portion of the map data, wherein the portion in each parcel represents the geographic features located in a corresponding respective separate one of a plurality of rectangular areas into which the region is divided, wherein each rectangular area has a size that corresponds to a uniform dimension in a first coordinate direction and a dimension in a second coordinate direction perpendicular to the first coordinate direction that is selected so that the portion of map data contained in each parcel is close to but does not exceed a predetermined maximum parcel size; and locating the map data in each parcel together on the physical storage medium, wherein the boundaries that extend in the second coordinate direction of each rectangular area adjacent to another rectangular area in the second coordinate direction are colinear.

2. The method of claim 1 wherein the first coordinate direction is latitude and the second coordinate direction is longitude.

3. The method of claim 1 wherein the first coordinate direction is longitude and the second coordinate direction is latitude.

4. The method of claim 1 further comprising:

storing the parcels on the physical storage medium.

5. The method of claim 4 further wherein the physical storage medium is a CD-ROM disk.

6. The method of claim 4 further wherein the physical storage medium is a DVD-ROM disk.

7. The method of claim 4 further wherein the physical storage medium is a hard disk.

8. The method of claim 1 wherein the step of separating further comprises:

separating the map data into a plurality of separate intermediate collections, wherein each separate intermediate collection contains an intermediate portion of the map data that represent the geographic features located in a corresponding separate intermediate section, wherein each intermediate section has a size that corresponds to the uniform dimension in the first coordinate direction and that extends across the region in the second coordinate direction; and organizing the parcels serially on the physical storage medium.

9. The method of claim 1 wherein the step of separating further comprises:

separating the map data into a plurality of separate intermediate collections, wherein each separate intermediate collection contains an intermediate portion of the map data that represent the geographic features located in a corresponding separate intermediate section, wherein each intermediate section has a size that corresponds to the uniform dimension in the first coordinate direction and that extends across the region in the second coordinate direction; and organizing the parcels serially on the physical storage medium beginning with the parcels representing the map data contained in the rectangular areas contained in the intermediate section located at a first edge of the region in the first coordinate direction and then proceeding to the parcels representing the map data contained in the rectangular areas contained in the intermediate section located immediately adjacent thereto, and so on, until the parcels representing the map data contained in the rectangular areas contained in the intermediate section located at the second edge of the region have been organized serially on the physical storage medium, wherein the second edge is opposite the first edge.

10. The method of claim 9 further comprising:

for the parcels representing the map data contained in the rectangular areas contained in each intermediate section, organizing the parcels serially on the media beginning with the parcel containing the map data representing the geographic features contained in the rectangular area at a first edge of the region in the second coordinate direction and then proceeding to the parcel representing the map data contained in the rectangular areas located immediately adjacent thereto, and so on, until the parcel representing the map data contained in the rectangular area located at the second edge of the region in the second coordinate direction, wherein the second edge is opposite the first edge, has been organized serially on the media.

11. The method of claim 1 further comprising:

organizing the parcels serially on the physical storage medium by the geographic coordinates of the corresponding rectangular areas represented thereby.

12. The method of claim 1 further comprising the step of:

assigning each parcel a parcel ID.

13. The method of claim 1 further comprising the step of:

assigning parcel IDs to the parcels, wherein the parcel IDs are assigned serially according to the geographic coordinates of the corresponding rectangular areas represented thereby.

14. The method of claim 1 wherein the parcels are identified by a serial numbering technique beginning with the parcel containing the map data that represent the geographic features contained in the rectangular area located at one corner and ending with the parcel containing the map data that represent the geographic features contained in the rectangular area located the opposite corner.

15. The method of claim 1 wherein the uniform dimension corresponds to a maximum change of coordinate direction that can be displayed on a display screen of a navigation system.

16. The method of claim 1 wherein the uniform dimension corresponds to a maximum change of latitude or longitude that can be displayed on a display screen of a navigation system.

17. The method of claim 1 wherein the uniform dimension corresponds to a maximum change of coordinate direction at a given zoom level that can be displayed on a display screen of a navigation system.

18. A map database product formed according to the method of claim 1.

19. A navigation system having map data organized according to the method of claim 1.

20. A method of organizing map data on a physical storage medium, wherein the map data represent geographic features located in a region, the method comprising:

determining a uniform dimension in a first coordinate direction for rectangular areas corresponding to data parcels;

determining a maximum data size for parcels; and separating the map data into separate parcels, wherein each parcel contains a portion of the map data that represent the geographic features located in a corresponding separate rectangular area, wherein each rectangular area has a size that corresponds to the uniform dimension in the fist coordinate direction and a dimension in a second coordinate direction that is selected so that the portion of map data contained in the parcel is close to but does not exceed the maximum data size for parcels, wherein the boundaries that extend in the second coordinate direction of each rectangular area adjacent to another rectangular area in the second coordinate direction are colinear.

21. The method of claim 20 wherein the first coordinate direction is longitude and the second coordinate direction is latitude.

22. The method of claim 20 further comprising:

storing the parcels on the physical storage medium.

23. The method of claim 20 further comprising:

after the step of separating the map data into separate parcels, organizing the parcels serially on the physical storage medium.

24. The method of claim 20 further comprising:

ordering the parcels on the physical storage medium according to the geographic coordinates of the corresponding rectangular areas represented by said parcels.

25. The method of claim 20 further comprising:

assigning each of the parcels a parcel identification.

26. The method of claim 20 further comprising:

assigning each of the parcels a parcel identification serially.

27. The method of claim 20 further comprising:

assigning each of the parcels a parcel identification by row and serially within each row.

28. A map database comprising:

map data that represent geographic features located in a region, wherein the map data are spatially organized into parcels such that each parcel contains that portion of the map data that represent the geographic features encompassed within a separate corresponding one of a plurality of rectangular areas that encompass the region, wherein the portion of map data in each parcel does not exceed a maximum data size determined for the parcels;

wherein each rectangular area of said plurality of rectangular areas has the same dimension in a first coordinate direction; and wherein the rectangular areas have dimensions in a second coordinate direction perpendicular to the first coordinate direction that vary such that the parcel formed from a corresponding rectangular area contains close to the maximum data size determined for the parcels without exceeding the maximum data size determined for the parcels, wherein the boundaries that extend in the second coordinate direction of each rectangular area adjacent to another rectangular area in the second coordinate direction are colinear.

29. The invention of claim 28 wherein the map data are stored on a computer readable medium.

30. The invention of claim 29 wherein the computer readable medium is a CD-ROM disk.

31. The invention of claim 29 wherein the computer readable medium is a DVD-ROM disk.

32. The invention of claim 29 wherein the computer readable medium is a hard disk.

33. The invention of claim 28 wherein the parcels are ordered on a computer readable medium according to the geographic coordinates of the corresponding rectangular areas of said parcels.

34. The invention of claim 28 wherein each of the parcels is assigned a parcel identification.

35. The invention of claim 28 wherein the plurality of parcels are assigned parcel identifications serially.

36. The invention of claim 28 wherein the plurality of parcels are assigned parcel identifications by row and serially within each row.

* * * * *